United States Patent
Yang et al.

(10) Patent No.: US 10,051,612 B2
(45) Date of Patent: *Aug. 14, 2018

(54) METHOD FOR TRANSMITTING/RECEIVING SIGNAL AND DEVICE THEREFOR

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,027

(22) Filed: Jul. 13, 2017

(65) Prior Publication Data
US 2017/0318576 A1    Nov. 2, 2017

Related U.S. Application Data

(63) Continuation of application No. 15/251,723, filed on Aug. 30, 2016, now Pat. No. 9,743,391, which is a (Continued)

(51) Int. Cl.
*H04L 1/18* (2006.01)
*H04W 72/02* (2009.01)
(Continued)

(52) U.S. Cl.
CPC ....... *H04W 72/0413* (2013.01); *H04L 1/0031* (2013.01); *H04L 1/1812* (2013.01); (Continued)

(58) Field of Classification Search
None
See application file for complete search history.

(56) References Cited

U.S. PATENT DOCUMENTS 9,178,682 B2    11/2015    Yang et al.
9,743,391 B2    8/2017    Yang et al.
(Continued)

FOREIGN PATENT DOCUMENTS

CN    101365175    2/2009
CN    101651890    2/2010
(Continued)

OTHER PUBLICATIONS

Ericsson, ST-Ericsson, "PUCCH design for carrier aggregation", R1-101730, 3GPP TSG-RAN WG1 #60bis, Apr. 2010, 4 pages.
(Continued)

*Primary Examiner* — Ayaz R Sheikh
*Assistant Examiner* — Tarell A Hampton
(74) *Attorney, Agent, or Firm* — Lee Hong Degerman Kang Waimey

(57) ABSTRACT

The present invention relates to a wireless communication system. More particularly, the present invention relates to a method for transmitting uplink control information and a device therefor, the method comprising the steps of: forming a plurality of serving cells each having different UL-DL configurations; receiving one or more signals requiring a HARQ-ACK response from M(M≥1) number of subframes; and executing the process for transmitting the HARQ-ACK response to the one or more signals in a specific subframe corresponding to the M number of subframes, wherein, only when the specific subframe is set as an uplink in all of the plurality of serving cells, the HARQ-ACK response to the one or more signals are transmitted through the specific subframe.

10 Claims, 17 Drawing Sheets

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

Related U.S. Application Data continuation of application No. 14/865,657, filed on Sep. 25, 2015, now Pat. No. 9,480,058, which is a continuation of application No. 14/000,166, filed as application No. PCT/KR2012/001816 on Mar. 13, 2012, now Pat. No. 9,178,682.

(60) Provisional application No. 61/452,153, filed on Mar. 13, 2011, provisional application No. 61/454,996, filed on Mar. 21, 2011, provisional application No. 61/466,473, filed on Mar. 23, 2011.

(51) Int. Cl.
| | | |
|---|---|---|
| *H04L 5/00* | (2006.01) | |
| *H04W 72/04* | (2009.01) | |
| *H04L 1/00* | (2006.01) | |
| *H04L 5/14* | (2006.01) | |

(52) U.S. Cl.
CPC .......... *H04L 1/1854* (2013.01); *H04L 1/1861* (2013.01); *H04L 5/001* (2013.01); *H04L 5/0033* (2013.01); *H04L 5/0055* (2013.01); *H04L 5/14* (2013.01)

(56) References Cited

U.S. PATENT DOCUMENTS

| | | | |
|---|---|---|---|
| 2009/0249153 | A1 | 10/2009 | Zhang |
| 2011/0134774 | A1 | 6/2011 | Pelletier et al. |
| 2011/0149717 | A1 | 6/2011 | Dai et al. |
| 2013/0195066 | A1* | 8/2013 | Lee ...................... H04W 52/04 370/329 |
| 2013/0223301 | A1 | 8/2013 | Lee et al. |
| 2013/0315135 | A1 | 11/2013 | Lee et al. |
| 2016/0014771 | A1 | 1/2016 | Yang et al. |

FOREIGN PATENT DOCUMENTS

| | | |
|---|---|---|
| EP | 2200208 | 6/2010 |
| EP | 2355567 | 8/2011 |
| EP | 2672775 | 12/2013 |
| WO | 2010/051752 | 5/2010 |
| WO | 2010069422 | 6/2010 |
| WO | 10/077103 | 7/2010 |
| WO | 2012113345 | 8/2012 |
| WO | WO 2012118279 A1 * | 9/2012 .......... H04J 11/0069 |

OTHER PUBLICATIONS

3rd Generation Partnership Project, "Technical Specification Group Radio Access Network; Evolved Universal Terrestrial Radio Access (E-UTRA); Physical layer procedures", 3GPP TS 36.213, V10.0.1, Dec. 2010, 98 pages.

ZTE, "Remaining issues of ACK/NACK feedback for LTE-A TDD", R1-110821, 3GPP TSG RAN WG1 Meeting #64, Feb. 2011, 7 pages.

Itri, "Discussions on UL-DL TDD Configurations for inter-band CA," 3GPP TSG-RAN WG1 Meeting #66bis, R1-113371, Oct. 2011, 7 pages.

Catt, "Design of TDD Inter-band Carrier Aggregation," 3GPP TSG RAN WG1 Meeting #67, R1-113724, Nov. 2011, 6 pages.

Intel Corporation, "Discussion on HARQ feedback of TDD Inter-band Carrier Aggregation," 3GPP TSG-RAN WG1 #67, R1-113951, Nov. 2011, 6 pages.

European Patent Office Application Serial No. 12757833.4, Search Report dated Sep. 24, 2014, 10 pages.

Nokia Corporation, et al., "LTE Carrier Aggregation Enhancements," 3GPP TSG RAN Meeting #51, RP-110451, Mar. 2011, 7 pages.

LG Electronics, "Uplink ACK/NACK transmission in LTE-Advanced," 3GPP TSG RAN WG1 #58bis, R1-094163, Oct. 2009, 6 pages.

Etri, "ACK/NACK Transmission on PUCCH for Carrier Aggregation," 3GPP TSG RAN WG1 Meeting #59bis, R1-100462, Jan. 2010, 5 pages.

PCT International Application No. PCT/KR2012/001816, Written Opinion of the International Searching Authority dated Oct. 23, 2012, 16 pages.

The State Intellectual Property Office of the People's Republic of China Application No. 201280013290.2, Notice of Allowance dated May 31, 2016, 6 pages.

European Patent Office Application No. 12757833.4, Office Action dated Jul. 4, 2016, 9 pages.

* cited by examiner

FIG. 13

| CC | Uplink-downlink configuration | Subframe number ||||||||||
|---|---|---|---|---|---|---|---|---|---|---|---|
| | | 0 | 1 | 2 | 3 | 4 | 5 | 6 | 7 | 8 | 9 |
| PCC | 0 | D | S | U | U | U | D | S | U | U | U |
| SCC | 1 | D | S | U | U | D | D | S | U | U | D |

FIG. 14

| UL-DL Configuration | Subframe n ||||||||||
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG. 15

| CC | Uplink-downlink configuration | Subframe number | | | | | | | | | |
|---|---|---|---|---|---|---|---|---|---|---|---|
| | | 0 | 1 | 2 | 3 | 4 | 5 | 6 | 7 | 8 | 9 |
| PCC | 1 | D | S | U | U | D | D | S | U | U | D |
| SCC | 2 | D | S | U | D | D | D | S | U | D | D |

FIG. 16

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | 6 | | | 4 | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 17

| CC | Uplink-downlink configuration | Subframe number | | | | | | | | | |
|---|---|---|---|---|---|---|---|---|---|---|---|
| | | 0 | 1 | 2 | 3 | 4 | 5 | 6 | 7 | 8 | 9 |
| PCC | 2 | D | S | U | D | D | D | S | U | D | D |
| SCC | 4 | D | S | U | U | D | D | D | D | D | D |

FIG. 18

| CC | Uplink-downlink configuration | Subframe number | | | | | | | | | |
|---|---|---|---|---|---|---|---|---|---|---|---|
| | | 0 | 1 | 2 | 3 | 4 | 5 | 6 | 7 | 8 | 9 |
| PCC | 1 | D | S | U | U | D | D | S | U | U | D |
| SCC | 2 | D | S | U | D | D | D | S | U | D | D |

FIG. 19

| PCC UL-DL configuration | Possible SCC UL-DL configuration |
|---|---|
| 0 | 0, 1, 2, 3, 4, 5, 6 |
| 1 | 1, 2, 4, 5 |
| 2 | 2, 5 |
| 3 | 3, 4, 5 |
| 4 | 4, 5 |
| 5 | 5 |
| 6 | 1, 2, 3, 4, 5, 6 |

FIG. 20

| PCC UL-DL configuration | Possible SCC UL-DL configuration |
|---|---|
| 0 | 0 |
| 1 | 0, 1, 6 |
| 2 | 0, 1, 2, 6 |
| 3 | 0, 3, 6 |
| 4 | 0, 1, 3, 4, 6 |
| 5 | 0, 1, 2, 3, 4, 5, 6 |
| 6 | 0, 6 |

METHOD FOR TRANSMITTING/RECEIVING SIGNAL AND DEVICE THEREFOR

CROSS-REFERENCE TO RELATED APPLICATIONS

This application is a continuation of U.S. patent application Ser. No. 15/251,723, filed on Aug. 30, 2016, now U.S. Pat. No. 9,743,391, which is a continuation of U.S. patent application Ser. No. 14/865,657, filed on Sep. 25, 2015, now U.S. Pat. No. 9,480,058, which is a continuation of U.S. patent application Ser. No. 14/000,166, filed on Aug. 16, 2013, now U.S. Pat. No. 9,178,682, which is the National Stage filing under 35 U.S.C. 371 of International Application No. PCT/KR2012/001816, filed on Mar. 13, 2012, which claims the benefit of U.S. Provisional Application No. 61/452,153, filed on Mar. 13, 2011, 61/454,996, filed Mar. 21, 2011, and 61/466,473, filed Mar. 23, 2011, the contents of which are all hereby incorporated by reference herein in their entirety.

TECHNICAL FIELD

The present invention relates to a wireless communication system, and more specifically, to a method for transmitting/receiving a signal in a TDD (Time Division Duplex) system and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Object

An object of the present invention is to provide a method and apparatus for efficiently transmitting/receiving a signal in a wireless communication system supporting TDD. Another object of the present invention is to provide a method and apparatus for efficiently transmitting/receiving a signal in a wireless communication system supporting multiple carriers and TDD.

The technical objects achieved by the present invention are not limited to the above technical problems and those skilled in the art may understand other technical objects from the following description.

Technical Solution

In an aspect of the present invention, a method for transmitting uplink control information by a user equipment (UE) in a TDD (Time Division Duplex) wireless communication system is disclosed herein, the method comprising: configuring a plurality of serving cells having different UL-DL (Uplink-Downlink) configurations; receiving one or more signals requiring a HARQ-ACK (Hybrid Automatic Repeat request-Acknowledgement) response in M (M≥1) subframes; and performing a process for transmitting the HARQ-ACK response to the one or more signals in a specific subframe corresponding to the M subframes, wherein the HARQ-ACK response to the one or more signals is transmitted through the specific subframe only when the specific subframe is configured as uplink in all the plurality of serving cells.

In an another aspect of the present invention, a user equipment (UE) configured to transmit uplink control information a TDD (Time Division Duplex) wireless communication system is disclosed herein, the UE comprising an RF unit and a processor, wherein the processor is configured to configure a plurality of serving cells having different UL-DL (Uplink-Downlink) configurations, to receive one or more signals requiring a HARQ-ACK (Hybrid Automatic Repeat request-Acknowledgement) response in M (M≥1) subframes, and to perform a process for transmitting the HARQ-ACK response to the one or more signals in a specific subframe corresponding to the M subframes, wherein the HARQ-ACK response to the one or more signals is transmitted through the specific subframe only when the specific subframe is configured as uplink in all the plurality of serving cells.

The M subframes corresponding to the specific subframe may be determined by a DASI (Downlink Association Set Index) of a UL-DL configuration configured for a serving cell having the largest number of DL subframes.

The HARQ-ACK response to the one or more signals may be transmitted through a PUCCH (Physical Uplink Control Channel) of a primary cell from among the plurality of serving cells.

The UE may generate a HARQ-ACK payload including the HARQ-ACK response to the one or more signals, wherein a size of the HARQ-ACK payload is determined by the number of serving cells and a value of M, wherein, when a serving cell having a subframe configured as uplink from among the M subframes is present, a HARQ-ACK response to the UL subframe of the serving cell is not included in the HARQ-ACK payload.

When the M subframes include a specific subframe which is not configured as downlink for all the plurality of serving cells, decoding of a PDSCH (Physical Downlink Shared Channel) may be skipped in the specific subframe and a HARQ-ACK response corresponding to the specific subframe may not be included in the HARQ-ACK payload.

The one or more signals requiring the HARQ-ACK response may include a PDSCH signal or a PDCCH (Physical Downlink Control Channel) signal indicating SPS (Semi-Persistent Scheduling) release.

Advantageous Effects

According to the present invention, a signal can be efficiently transmitted/received in a wireless communication system supporting TDD. Furthermore, a signal can be efficiently transmitted/received in a wireless communication system supporting multiple carriers and TDD.

The effects achieved by the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIGS. 13 and 14 are tables for illustrating TDD UL ACK/NACK transmission timing according to an embodiment of the present invention;
FIGS. 15 and 16 are tables for illustrating TDD DL ACK/NACK transmission timing according to an embodiment of the present invention;
FIGS. 17 to 20 are tables for illustrating nested carrier aggregation according to an embodiment of the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the present invention is described focusing on 3GPP LTE/LTE-A for clarity, this is purely exemplary and thus should not be construed as limiting the present invention.

Figure 1:
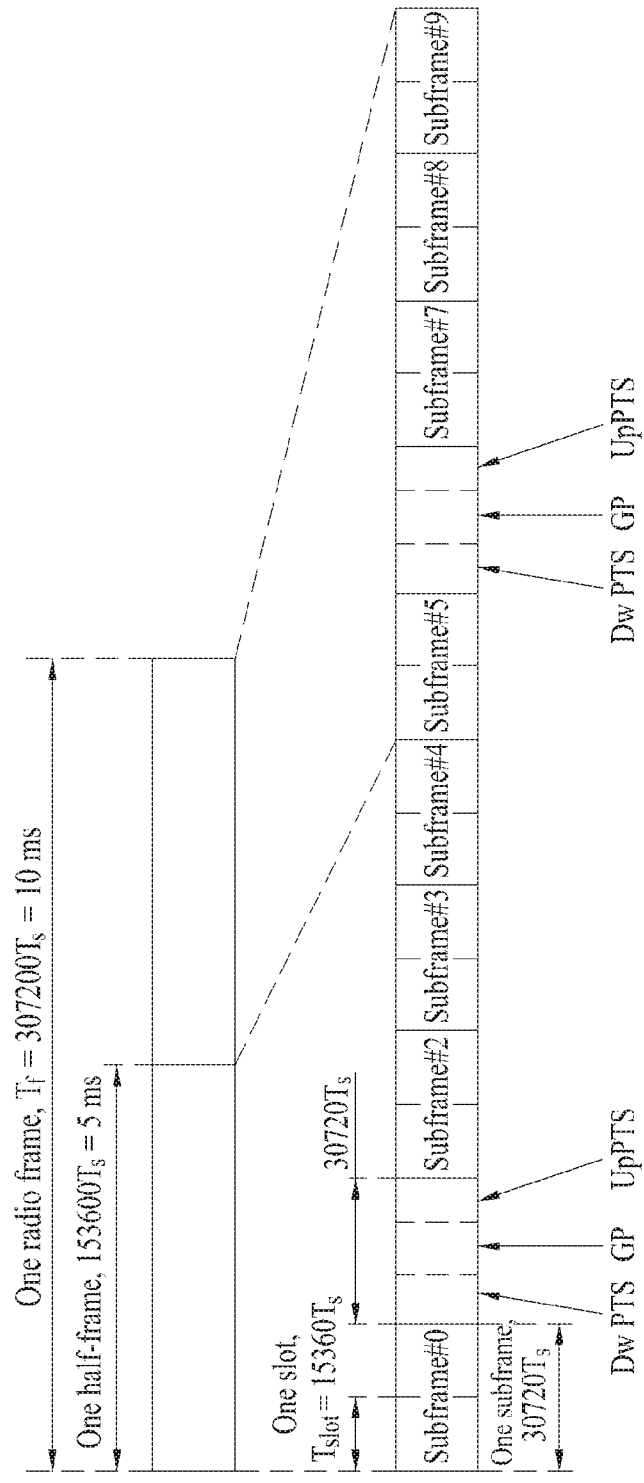
FIG. 1 illustrates a radio frame structure.

FIG. 1 illustrates a radio frame structure.

Referring to FIG. 1, a radio frame used in 3GPP LTE(-A) has a length of 10 ms ($307200 T_s$) and includes 10 subframes of equal size. The 10 subframes in the radio frame may be numbered. Here, $T_s$ denotes sampling time and is represented as $T_s=1/(2048*15 \text{ kHz})$. Each subframe has a length of 1 ms and includes two slots. 20 slots in the radio frame may be sequentially numbered from 0 to 19. Each slot has a length of 0.5 ms. A transmission time for a subframe is defined as a transmission time interval (TTI). Time resources may be distinguished by a radio frame number (or radio frame index), a subframe number (or subframe index), a slot number (or slot index), and etc.

The radio frame may be configured differently according to a duplex mode. In a FDD (Frequency Division Duplex) mode, downlink transmission and uplink transmission are distinguished by frequency, and thus the radio frame includes only one of a downlink subframe and an uplink subframe in a specific frequency band. In a TDD (Time Division Duplex) mode, downlink transmission and uplink transmission are distinguished by time, and thus the radio frame includes both a downlink subframe and an uplink subframe in a specific frequency band.

Particularly, FIG. 1 shows a radio frame structure for TDD, used in 3GPP LTE(-A). Table 1 shows UL-DL (Uplink-Downlink) configurations of each subframe in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| | | Normal | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
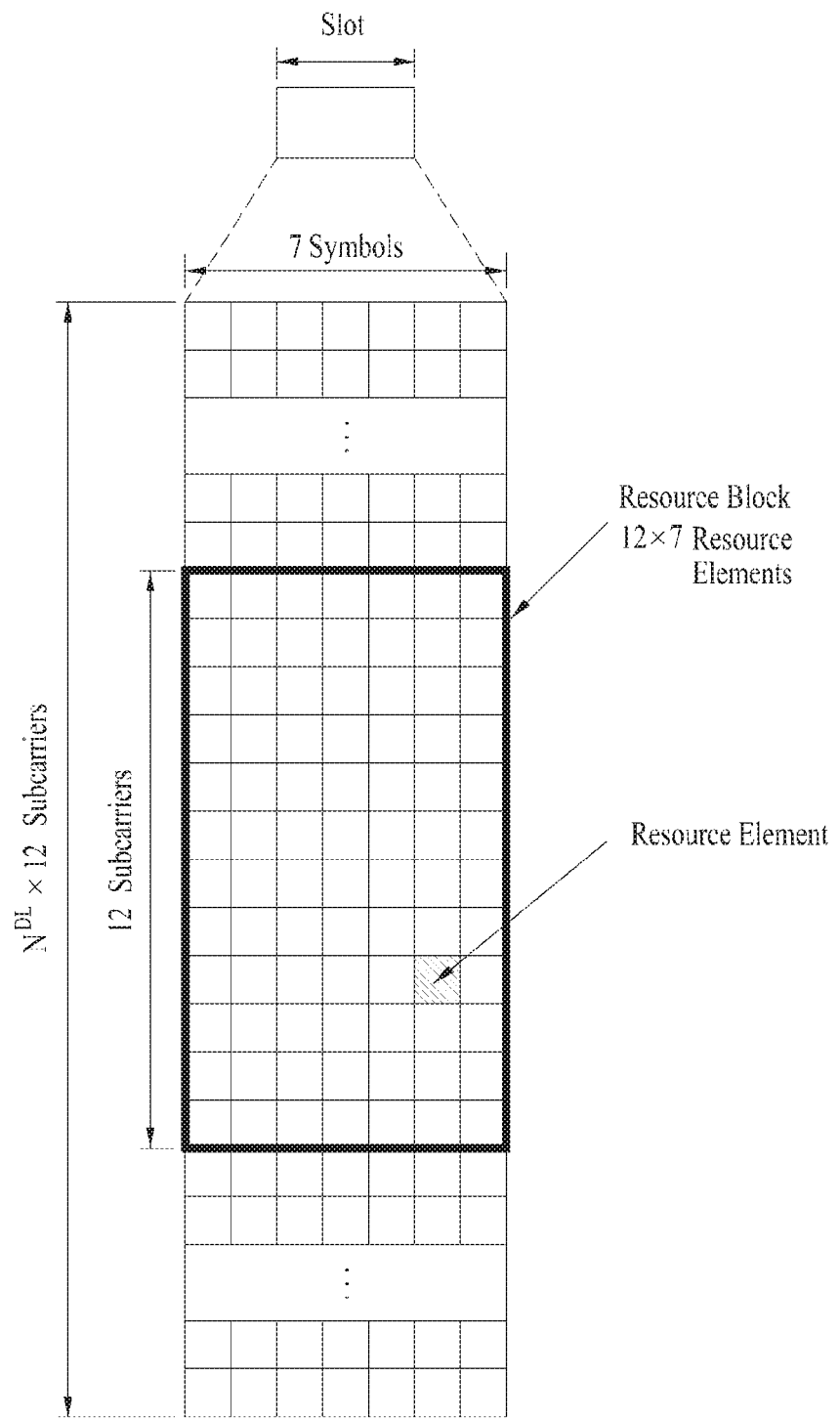
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmission bandwidth. The structure of an uplink slot may be the same as that of the downlink slot except that OFDM symbols are replaced by SC-FDMA symbols.

Figure 3:
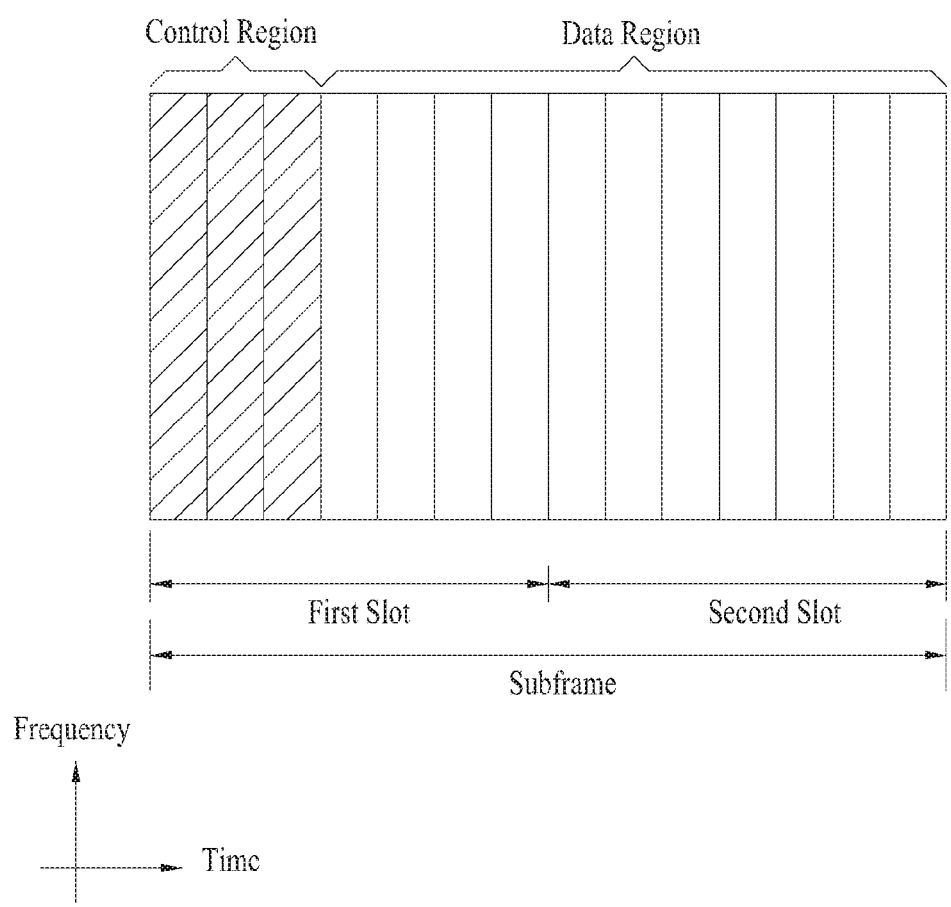
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The transport block means a data block transmitted from a MAC (Medium Access Control) layer to a PHY (Physical) layer via a transport channel. The codeword corresponds to a coded version of a transport block. The relationship between the transport block and the codeword depends on swapping. In the specification, the PDSCH, transport block and codeword are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response to uplink transmission and carries a HARQ-ACK (Hybrid Automatic Repeat reQuest Acknowledgment) signal. A HARQ-ACK response includes a positive ACK (simply, ACK), a negative ACK (Negative ACK), DTX (Discontinuous Transmission) or NACK/DTX. Here, HARQ-ACK is used interchangeably with HARQ ACK/NACK or ACK/NACK.

Control information transmitted via a PDCCH is referred to as downlink control information (DCI). The DCI includes resource allocation information for a UE or UE group and other control information. For example, the DCI includes uplink/downlink scheduling information, an uplink transmit (Tx) power control command, etc. Information content of transmission modes and DCI formats for configuring a multi-antenna technology are as follows.

Transmission Mode

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5: Multi-user MIMO

Transmission mode 6: Closed-loop rank-1 precoding

Transmission mode 7: Transmission using UE-specific reference signals

DCI Format

Format 0: Resource grants for the PUSCH (Physical Uplink Shared Channel) transmissions (uplink)

Format 1: Resource assignments for single codeword PDSCH (Physical Downlink Shared Channel) transmissions (transmission modes 1, 2 and 7)

Format 1A: Compact signaling of resource assignments for single codeword PDSCH (all modes)

Format 1B: Compact resource assignments for PDSCH using rank-1 closed loop precoding (mod 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH (Physical Uplink Control Channel) and PUSCH with 2-bit/1-bit power adjustments As described above, the PDCCH may carry transport format and resource allocation information of a downlink shared channel (DL-SCH), transport format and resource allocation information of an uplink shared channel (UL-SCH), paging information on a paging channel (PCH), system information on the DL-SCH, resource allocation information of an upper-layer control message such as a random access response transmitted on a PDSCH, a set of Tx power control commands for individual UEs within a UE group, a Tx power control command, information indicating activation of a voice over IP (VoIP), etc. A plurality of PDCCHs may be transmitted within a control region. The UE may monitor the plurality of PDCCHs. The PDCCH is transmitted on an aggregation of one or several consecutive control channel elements (CCEs). The CCE is a logical allocation unit used to provide a coding rate for the PDCCH based on a radio channel state. The CCE corresponds to a plurality of resource element groups (REGs). A format and the number of bits for the PDCCH are determined by the number of CCEs. A base station determines a PDCCH format according to DCI to be transmitted to the UE, and attaches a cyclic redundancy check (CRC) to the control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
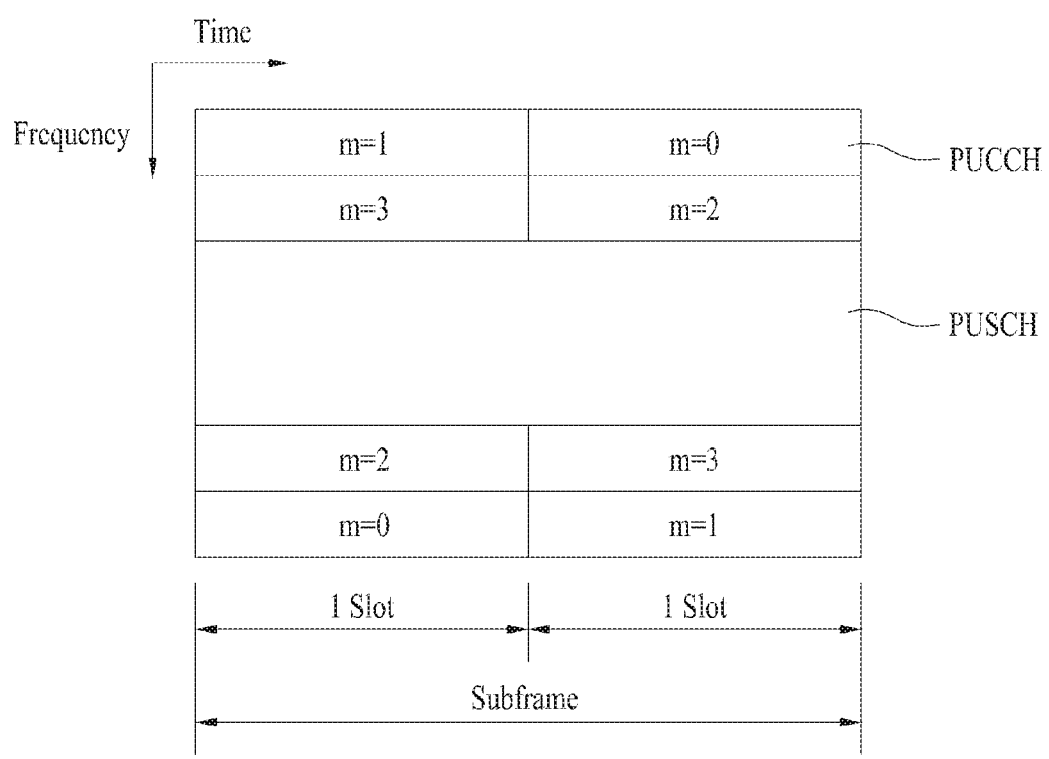
FIG. 4 illustrates an uplink subframe structure.

FIG. 4 illustrates an uplink subframe structure.

Referring to FIG. 4, an uplink subframe includes a plurality of (e.g. 2) slots. A slot may include different number of SC-FDMA symbols according to a CP length. The uplink subframe is divided into a control region and a data region in the frequency domain. The data region comprises a PUSCH and is used to carry a data signal such as audio data. The control region comprises a PUCCH and is used to carry uplink control information (UCI). The PUCCH includes an RB pair located at both ends of the data region in the frequency domain and hops in a slot boundary.

The PUCCH may be used to transmit the following control information.

Scheduling Request (SR): This information is used to request a UL-SCH resource and is transmitted using an On-Off Keying (OOK) scheme.

HARQ ACK/NACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ response includes positive ACK (simply, ACK), negative ACK (NACK), and DTX (Discontinuous Transmission) or NACK/DTX. Here, the term HARQ-ACK is used interchangeably with the term HARQ ACK/NACK or ACK/NACK.

Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE may transmit in a subframe depends on the number of SC-FDMA symbols available for control information transmission. The SC-FDMA symbols available for control information transmission means SC-FDMA symbols other than SC-FDMA symbols used for transmitting reference signals. In the case of a subframe in which a Sounding Reference Signal (SRS) is configured, the last SC-FDMA symbol of the subframe is excluded from the SC-FDMA symbols available for control information transmission. A reference signal is used for coherent detection of a PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1-bit or 2-bit HARQ ACK/NACK (20 bits) (only in case of extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 10.

Figure 5:
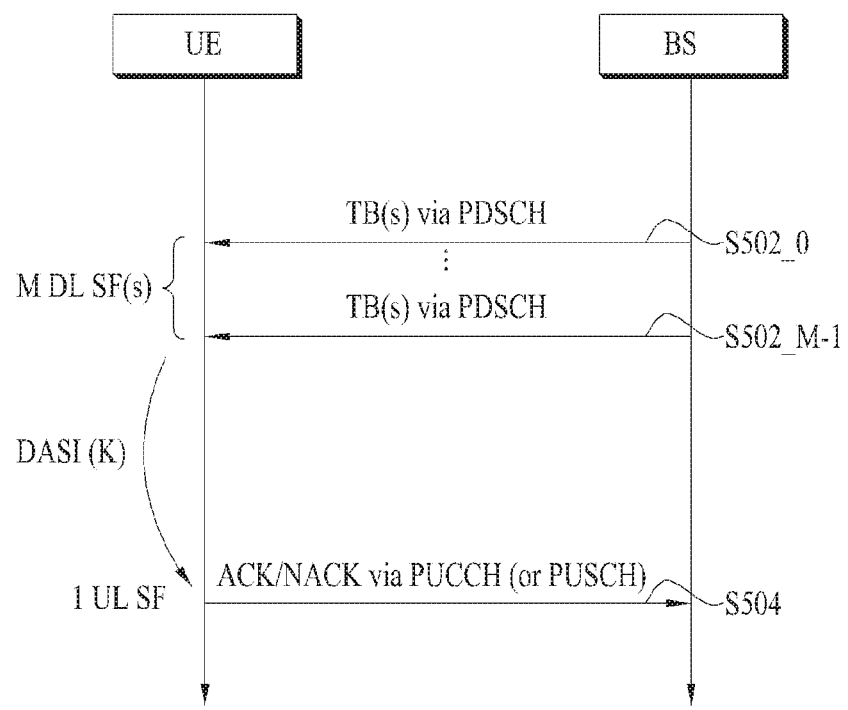
FIGS. 5 and 6 illustrate TDD UL ACK/NACK transmission timing in a single cell case.
Figure 6:
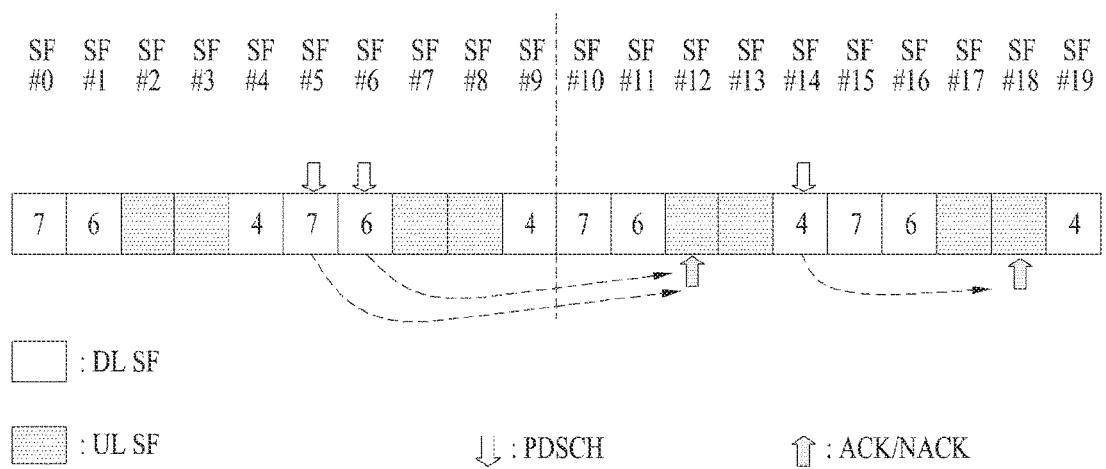

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE may receive one or more PDSCH signals in M DL subframes (SFs) (S502_0 to S502_M−1). Each PDSCH signal is used to transmit one or more (e.g. 2) transport blocks (TBs) according to a transmission mode. A PDCCH signal indicating release of SPS (Semi-Persistent Scheduling) may also be received in steps S502_0 to S502_M−1, which is not shown. When a PDSCH signal and/or a SPS release PDCCH signal are present in the M DL subframes, the UE transmits ACK/NACK through in one UL subframe corresponding to the M DL subframes (S504) through a procedure for transmitting ACK/NACK (e.g. ACK/NACK (payload) generation, ACK/NACK resource allocation, etc.). ACK/NACK includes acknowledgement information about the PDSCH signal and/or SPS release PDCCH received in step S502_0 to S502_M−1. While ACK/NACK is transmitted through a PUCCH basically, ACK/NACK is transmitted via a PUSCH when the PUSCH is transmitted at an ACK/NACK transmission time. Various PUCCH formats shown in Table 3 may be used for ACK/NACK transmission. To reduce the number of ACK/NACK bits transmitted through a PUCCH format, various methods such as ACK/NACK bundling and ACK/NACK channel selection may be used.

As described above, in TDD, ACK/NACK for data received at the M DL subframes is transmitted through one UL subframe (i.e. M DL SF(s):1 UL SF) and the relationship therebetween is determined by a DASI (Downlink Association Set Index).

Table 4 shows DASI (K: {k0, k1, . . . , k−1}) defined in LTE(−A). Table 4 shows intervals between a UL subframe transmitting ACK/NACK and a DL subframe associated with the UL subframe from the perspective of the UL subframe. Specifically, when a PDCCH that indicates PDSCH transmission and/or SPS (Semi-Persistent Scheduling) release is present in a subframe n−k (k∈ K), the UE transmits ACK/NACK in a subframe n.

TABLE 4

| TDD UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE 4-continued

| TDD UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 6 illustrates a UL ACK/NACK transmission timing when UL-DL configuration #1 is configured. In the figure, each of SF#0 to #9 and SF#10 to #19 corresponds to a radio frame, and each numeral in blocks denotes a UL subframe associated with a DL subframe from the perspective of the DL subframe. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/SF#6 are transmitted in SF#12. Similarly, ACK/NACK for a PDSCH of SF#14 is transmitted in SF#14+4 (=SF#18).

Figure 7:
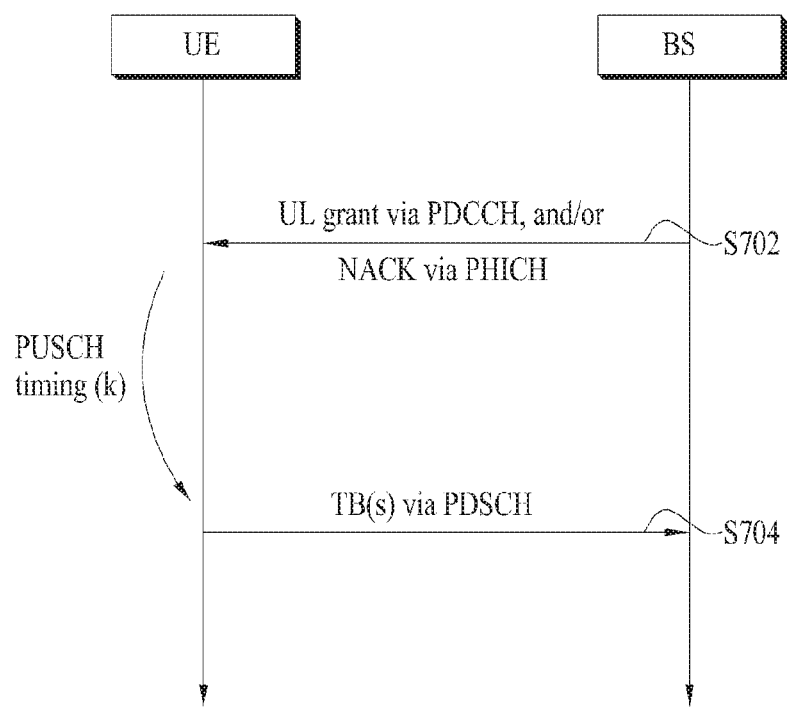
FIGS. 7 and 8 illustrate TDD PUSCH transmission timing in a single cell case.
Figure 8:
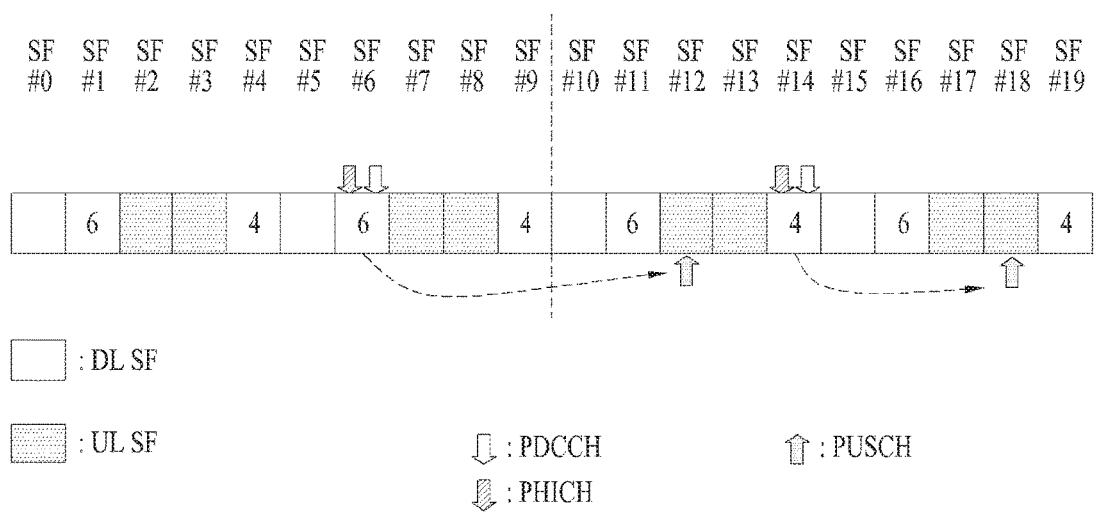

FIGS. 7 and 8 illustrate PHICH grant-PUSCH timing. A PUSCH may be transmitted corresponding to a PDCCH (UL grant) and/or a PHICH (NACK).

Referring to FIG. 7, a UE may receive a PDCCH (UL grant) and/or a PHICH (NACK) via a PDCCH (S702). Here, NACK corresponds to an ACK/NACK response to the previous PUSCH transmission. In this case, the UE may initially transmit/retransmit one or more transport blocks (TBs) through a PUSCH after k subframes (S704), through a procedure for PUSCH transmission (e.g. TB coding, TB-CW swiping, PUSCH resource allocation, etc.). The present embodiment is based on the assumption of performing a normal HARQ operation in which a PUSCH is transmitted once. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows intervals between a DL subframe where a PHICH/UL grant is detected and a UL subframe associated with the DL subframe from the perspective of the DL subframe. Specifically, when a PHICH/UL grant is detected in a subframe n, a UE may transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 8 illustrates a PUSCH transmission timing when UL-DL configuration #1 is configured. In the figure, each of SF#0 to #9 and SF#10 to #19 corresponds to a radio frame, and each numeral in blocks denotes a UL subframe associated with a DL subframe from the perspective of the DL subframe. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
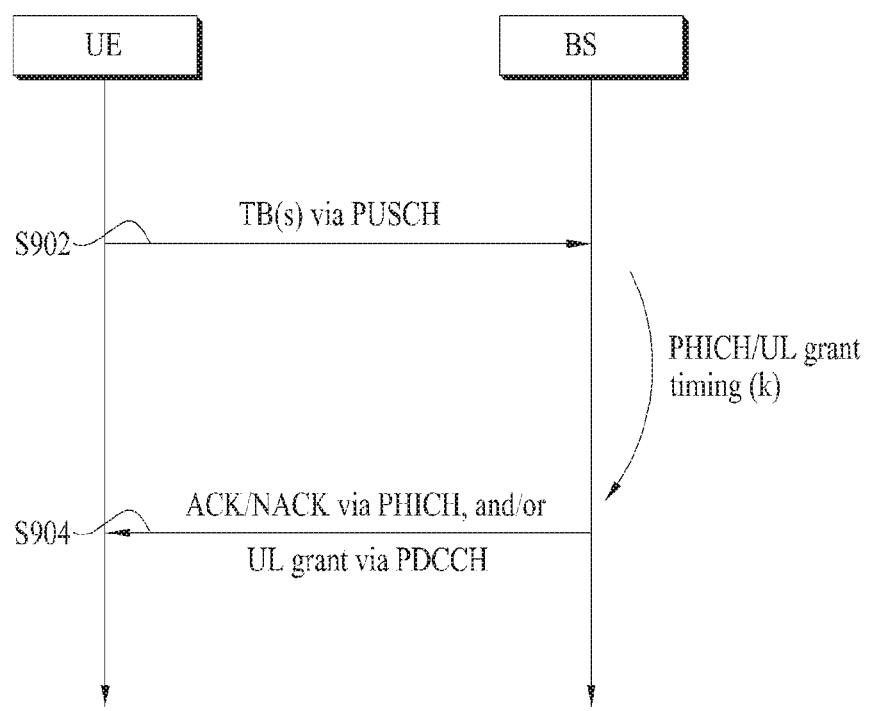
FIGS. 9 and 10 illustrate TDD DL ACK/NACK transmission timing in a single cell case.
Figure 10:
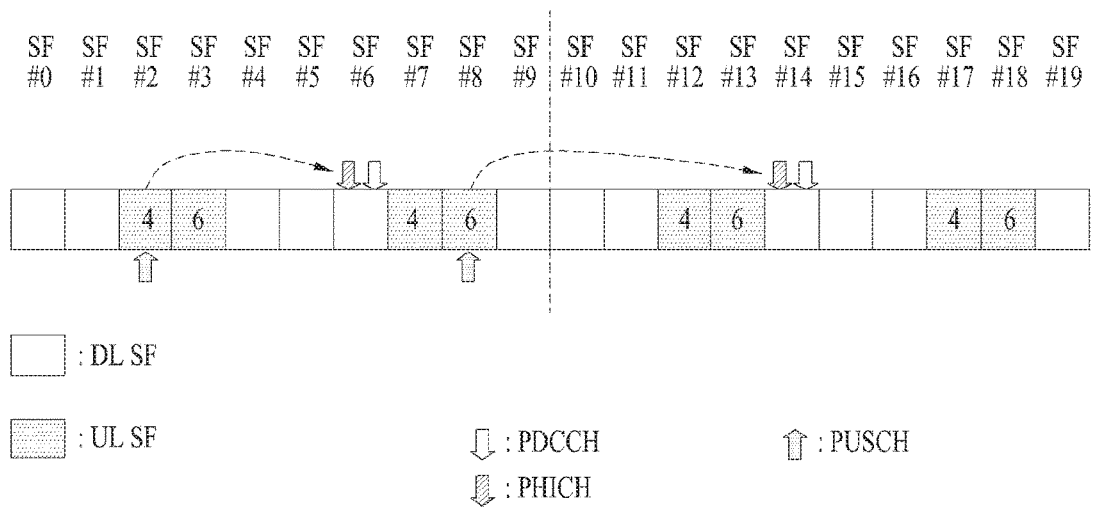

FIGS. 9 and 10 illustrate a PUSCH-PHICH/UL grant timing. PHICH is used to transmit DL ACK/NACK. Here, DL ACK/NACK means ACK/NACK transmitted on downlink as a response to UL data (e.g. PUSCH).

Referring to FIG. 9, a UE transmits a PUSCH signal to a base station (S902). Here, the PUSCH signal is used to transmit one or more (e.g. 2) transport blocks (TBs) according to a transmission mode. The base station may transmit ACK/NACK as a response to PUSCH transmission via a PHICH after k subframes (S904), through a procedure for ACK/NACK transmission (e.g. ACK/NACK generation, ACK/NACK resource allocation, etc.). ACK/NACK includes acknowledgement information about the PUSCH signal of the step S902. When a response to PUSCH transmission is NACK, the base station may transmit a UL grant PDCCH for PUSCH retransmission to the UE after k subframes (S904). The present embodiment is based on the assumption of performing a normal HARQ operation in which a PUSCH is transmitted once. In this case, a PHICH and UL grant used for PUSCH transmission may be transmitted in the same subframe. In case of subframe bundling, however, the PHICH and UL grant used for PUSCH transmission may be transmitted in different subframes.

Table 6 shows a UAI for PHICH/UL grant transmission in LTE(-A). Table 6 shows intervals between a DL subframe in which a PHICH/UL grant is present and a UL subframe associated with the DL subframe from the perspective of the DL subframe. Specifically, a PHICH/UL grant of a subframe i corresponds to PUSCH transmission of a subframe i-k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

FIG. 10 illustrates a PHICH/UL grant transmission timing when UL-DL configuration #1 is configured. In the figure, each of SF#0 to #9 and SF#10 to #19 corresponds to a radio frame, and each numeral in blocks denotes a DL subframe associated with a UL subframe. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

Figure 11:
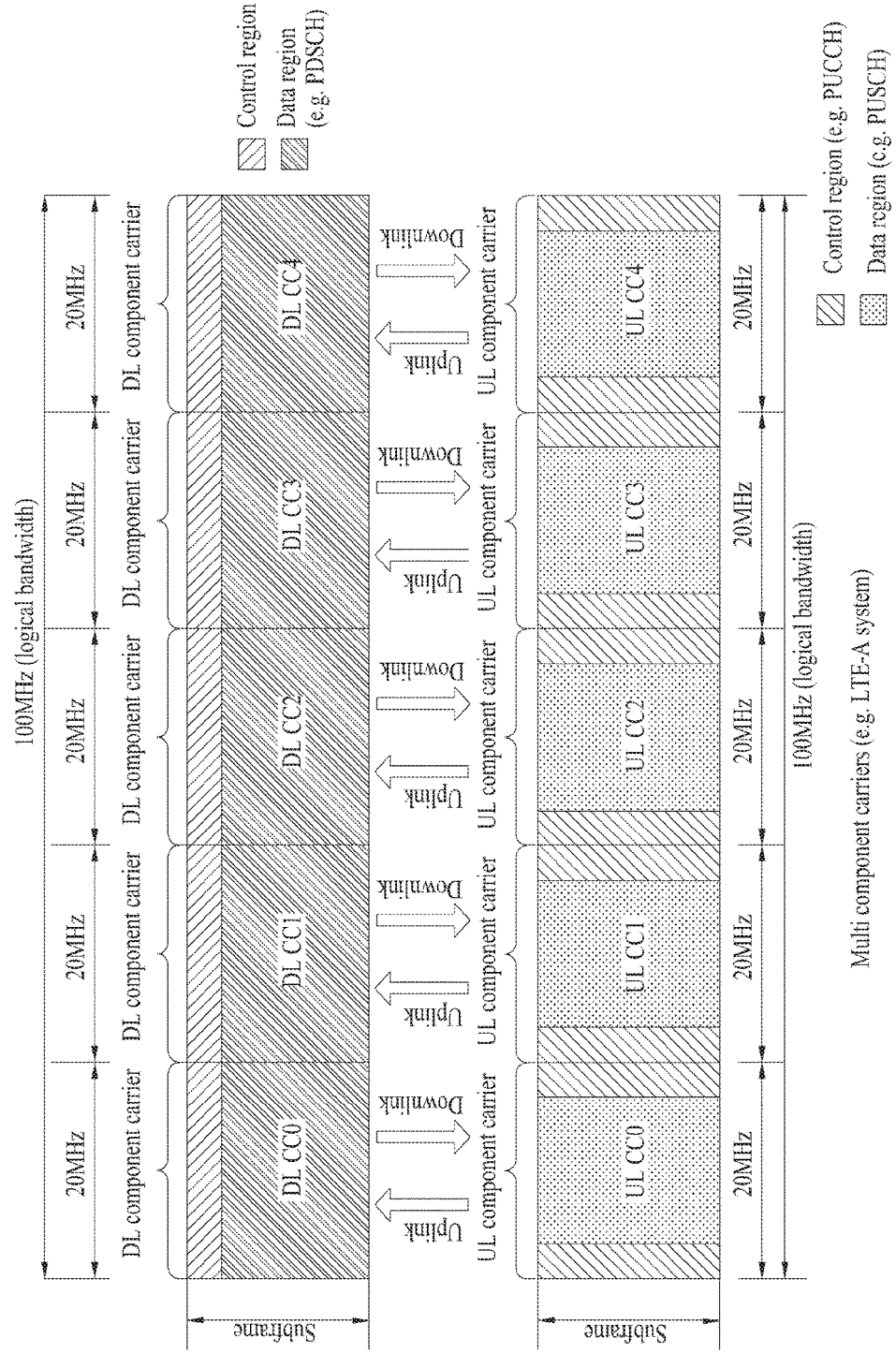
FIG. 11 illustrates a carrier aggregation (CA) communication system.

FIG. 11 illustrates a communication system for carrier aggregation (CA). A LTE-A system employs carrier aggregation (or bandwidth aggregation) technology which aggregates a plurality of uplink/downlink frequency blocks to obtain a wider uplink/downlink bandwidth. Each frequency block is transmitted using a component carrier (CC). The CC may be construed as a carrier frequency (or center carrier, center frequency) for the corresponding frequency block.

Referring to FIG. 11, a plurality of uplink/downlink CCs may be aggregated to support a wider uplink/downlink bandwidth. The CCs may be contiguous or non-contiguous in the frequency domain. A bandwidth of each component carrier may be independently determined. Asymmetrical carrier aggregation is possible, in which the number of UL CCs is different from the number of DL CCs may be implemented. For example, when there are two DL CCs and one UL CC, the DL CCs and UL CC may be configured to be in 2:1 correspondence. A DL CC/UL CC link may be fixed or semi-statically configured in the system. Even if the entire system bandwidth is configured with N number of CCs, a frequency band where a specific UE can monitor/receive may be limited to M (<N) number of CCs. Various parameters for carrier aggregation may be configured cell-specifically, UE-group-specifically, or UE-specifically. Control information may be transmitted/received only via a specific CC. This specific CC may be referred to as a Primary CC (PCC) (or anchor CC) and the other CCs may be referred to as Secondary CCs (SCCs).

In LTE-A, the concept of a cell is used to manage radio resources. A cell is defined as a combination of downlink resource and uplink resource. Yet, the uplink resource is not mandatory. Therefore, a cell may be composed of downlink resource only or both downlink resource and uplink resource. The linkage between a carrier frequency (or DL CC) of downlink resource and a carrier frequency (or UL CC) of uplink resource may be indicated by system information. A cell operating in primary frequency resource (or PCC) may be referred to as a primary cell (PCell) and a cell operating in secondary frequency resource (or a SCC) may be referred to as a secondary cell (SCell). The PCell is used for a UE to perform a procedure for initial connection establishment or a procedure for connection re-establishment. The PCell may refer to a cell operating on a DL CC SIB2-linked to a UL CC. Furthermore, the PCell may refer to a cell indicated during handover. The SCell may be configured after RRC connection establishment and may be used to provide additional radio resource. The PCell and the SCell may collectively be referred to as a serving cell. Accordingly, there exists a single serving cell composed of a PCell only for a UE in an RRC_Connected state for which carrier aggregation is not configured or which does not support CA. On the other hand, there exist one or more serving cells including a PCell and entire SCells for a UE in an RRC_CONNECTED state, for which carrier aggregation is configured. For carrier aggregation, a network may configure one or more SCells in addition to an initially configured PCell, for a UE supporting carrier aggregation during a procedure for connection establishment after a procedure for initial security activation is initiated.

Figure 12:
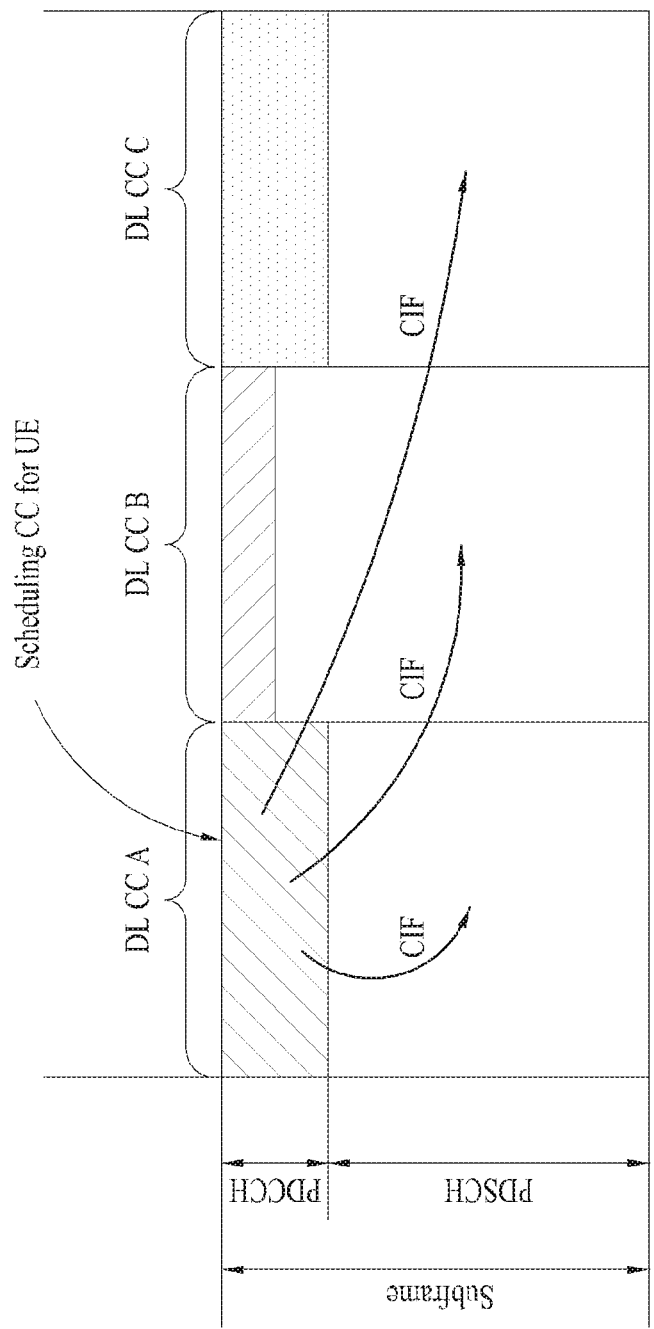
FIG. 12 illustrates scheduling in case of aggregation of a plurality of carriers.

FIG. 12 illustrates scheduling when a plurality of carriers is aggregated. It is assumed that 3 DL CCs are aggregated and DL CC A is set to a PDCCH CC. Each of DL CC A, DL CC B and DL CC C may be referred to as a serving CC, serving carrier, serving cell, etc. In case of CIF (Carrier Indicator Field) disabled, each DL CC may transmit only a PDCCH that schedules a PDSCH of the DL CC itself without a CIF (non-cross-CC scheduling). When the CIF is enabled by UE-specific (or UE-group-specific or cell-specific) higher layer signaling, a specific CC (e.g. DL CC A) may carry not only a PDCCH that schedules the PDSCH of the DL CC A but also PDCCHs that schedule PDSCHs of other DL CCs using the CIF (cross-CC scheduling). A PDCCH is not transmitted in DL CC B/C. Here, a specific CC (or cell) used to transmit a PDCCH is called a scheduling CC (or scheduling cell). The term scheduling CC (or cell) may be used interchangeably with the term PDCCH monitoring CC (or PDCCH monitoring cell). A CC (or cell) in which a PDSCH/PUSCH is scheduled by a PDCCH of another CC is called a scheduled CC (or scheduled cell). One or more scheduling CCs may be configured for one UE. A scheduling CC includes a PCC. When only one scheduling CC is configured, the scheduling CC corresponds to the PCC. The scheduling CC may be configured UE-specifically, UE group-specifically or cell-specifically.

A conventional CA TDD system only considers a case in which each aggregated CC has the same UL-DL configuration. In this case, a TDD signal transmission timing in a single cell situation, described with reference to FIGS. 5 to 10, may be used because all CCs have the same DL/UL subframe timing. However, a scheme for independently setting UL-DL configurations for respective CCs in consideration of a UL/DL load difference and a channel state difference between CCs is under discussion recently. However, if a plurality of CCs has different UL-DL configurations when cross-CC scheduling is applied, the following problem may be encountered in relation to signal transmission/reception timings.

A CC carrying data and ACK/NACK for the data may be determined based on the following criteria in a cross-CC scheduling situation.

PDSCH/PUSCH: CC indicated by a CIF of a PDCCH detected from a scheduling CC

DL ACK/NACK (e.g. PHICH): scheduling CC (e.g. DL PCC)

UL ACK/NACK (e.g. PUCCH): UL PCC

As described above, a CC carrying a signal is determined by a predetermined rule according to signal type. If all CCs have the same UL-DL configuration, there is no problem for signal transmission according to the above-described criteria. However, when UL-DL configurations are independently given per CCs and thus the CCs have different UL-DL configurations, there occurs a problem in signal transmission/reception because DL/UL subframes available for the CCs are different. Furthermore, it may be necessary to define new UL/DL ACK/NACK timing and/or DL/UL grant timing.

To solve the above-described problem, the present invention proposes a method of configuring a signal transmission timing (e.g. UL ACK/NACK transmission timing, UL grant transmission timing and DL ACK/NACK transmission timing) in a system supporting CA and TDD. In case of UL ACK/NACK, the following proposed method may be applied irrespective of non-cross-CC scheduling and cross-CC scheduling. In case of UL grant/PHICH, the method proposed hereinafter may be applied only when a cross-CC scheduling mode is configured or cross-CC scheduling is actually performed. For example, when a scheduling CC schedules only itself (i.e. non-cross-CC scheduling) even though a cross-CC scheduling mode has been configured, the method proposed hereinafter may not be used. In this case, the conventional TDD signal transmission timing configured for the scheduling CC may be applied.

Embodiments of the present invention will now be described on the assumption that 2 CCs (i.e. a PCC and a SCC) having different UL-DL configurations are aggregated. However, the embodiments of the present invention may be applied to a case in which three or more CCs having different UL-DL configurations are aggregated. In the following description, the PCC and SCC may be construed according to the original definition, or may be construed as a scheduling CC and a scheduled CC, respectively. For example, the PCC and SCC may mean a PCC and SCC in case of UL ACK/NACK, whereas the PCC and SCC may mean a scheduling CC and a scheduled CC in case of UL grant/PHICH. In addition, D denotes a DL subframe, S denotes a special subframe, and U denotes a UL subframe in the following description. It is assumed that S is used as D or U and, unless otherwise specified, it is used as D. In the following description, the term CC is used interchangeably with the term cell (or serving cell) and the term PCC and SCC may be respectively used interchangeably with the term PCell and an SCell.

Embodiment 1: UL ACK/NACK Timing

The present embodiment proposes a scheme for transmitting uplink control information (e.g. UL ACK/NACK) in an environment in which a plurality of CCs having different UL-DL configurations are aggregated for a UE operating in TDD. In consideration of a situation in which a plurality of CCs having different TDD UL-DL configurations are aggregated for the UE and UL ACK/NACK is transmitted via only one CC, it is necessary to define a scheme for feeding back UL ACK/NACK information via one CC regarding data (e.g. PDSCHs) received on a plurality of CCs.

The proposals of the present embodiment are summarized as follows.

Rule 1-1: UL ACK/NACK Transmission Subframe

When a plurality of CCs having different UL-DL configurations are aggregated for a UE, UL ACK/NACK may be transmitted only in a subframe in which all the CCs aggregated for the UE are configured as UL, or in a subset (part) of the subframe. When a subframe (determined using a DASI (Downlink Association Set Index) of the corresponding CC or a specific CC), which is associated with the subframe in which all the CCs are configured as UL, is not configured as DL for all the CCs (e.g. PCC: U, SCC: D), the UE may skip decoding of PDSCH in the corresponding subframe. Accordingly, a HARQ-ACK response for the corresponding subframe may not be included in a HARQ-ACK payload.

Rule 1-2: DASI (Downlink Association Set Index)

A DASI (refer to Table 4) of a CC having a larger number of DL subframes is commonly applied to all the aggregated CCs. Equivalently, a DASI of a CC having a smaller number of UL subframes is commonly applied to all aggregated CCs.

*Rules 1-1 and 1-2 describe that the proposed method is applied to all the aggregated CCs when some of the CCs have different UL-DL configurations. However, Rules 1-1 and 1-2 may be modified such that the proposed method is applied to a SCC corresponding to UL ACK/NACK (i.e. a CC carrying a PDSCH corresponding to UL ACK/NACK) only when UL-DL configuration of the SCC is different from UL-DL configuration of the PCC, but otherwise the conventional scheme is applied to determine UL ACK/NACK timing.

FIGS. 13 and 14 illustrate a UL ACK/NACK timing configuration scheme according to the present embodiment.

Referring to FIG. 13, it is assumed that a PCC having UL-DL configuration #0 and a SCC having UL-DL configuration #1 are configured for a UE. UL ACK/NACK is transmitted via the PCC. According to Rule 1-1, UL ACK/NACK may be transmitted only in subframes (subframes #2/#3/#7/#8) in which both the PCC and SCC are configured as UL, or in a subset of the subframes, from among UL subframes of the PCC. That is, subframes #4/#9 of the PCC are not used for UL ACK/NACK transmission. The method according to the present embodiment may be applied to only a case in which cross-CC scheduling from the PCC to the SCC occurs.

According to Rule 1-2, DL subframes associated with subframes #2/#3/#7/#8 of the PCC are determined by a DASI of the SCC (i.e. UL-DL configuration #1) (FIG. 14). This is because the number of DL subframes of the SCC is greater than the number of DL subframes of the PCC, equivalently, the number of UL subframes of the SCC is less than the number of UL subframes of the PCC.

Accordingly, the UE may determine a ACK/NACK payload for the two CCs or a DL subframe that needs to be fed back, by commonly applying the DASI of the SCC to the two CCs when UL ACK/NACK is transmitted on the PCC. If DASI (k) of UL-DL configuration #1 indicates a UL subframe in FIG. 14, UL ACK/NACK for the corresponding UL subframe may not be added to an ACK/NACK payload. That is, the corresponding subframe may not be considered during UL ACK/NACK transmission. In a normal case, the size of UL ACK/NACK payload is determined according to the number of DL subframes according to a DASI, the number of aggregated (or activated) CCs, a transmission mode of the corresponding subframe. Alternatively, in order to reduce UL ACK/NACK detection error caused by change of the size of ACK/NACK payload, when a subframe indicated by DASI (k) is a UL subframe, ACK/NACK for the corresponding subframe may be set to NACK/DTX to maintain the size of ACK/NACK payload constant.

According to the proposed method, it is possible to utilize the conventional UL ACK/NACK timing (e.g. DASI) without defining new UL ACK/NACK timing when a plurality of CCs having different UL-DL configurations is aggregated.

Embodiment 2: DL ACK/NACK (or UL Grant) Timing

The present embodiment proposes a scheme for transmitting downlink control information (e.g. DL ACK/NACK) in an environment in which a plurality of CCs having different UL-DL configurations are aggregated for a UE operating in TDD. In consideration of a situation in which a plurality of CCs having different TDD UL-DL configurations are aggregated for the UE and DL ACK/NACK is transmitted via only a scheduling CC, it is necessary to define a scheme for feeding back DL ACK/NACK information via one CC regarding data (e.g. PUSCHs) received on a plurality of CCs.

While the following description is focused on DL ACK/NACK (e.g. PHICH) for convenience, the present invention is equally/similarly applied to a case in which a UL grant (e.g. PDCCH) is transmitted.

The proposals of the present embodiment are summarized as follows.

Rule 2-1: DL ACK/NACK Transmission Subframe

When a plurality of CCs having different UL-DL configurations are aggregated for a UE, DL ACK/NACK may be transmitted only in a subframe in which all the CCs aggregated for the UE are configured as DL, or in a subset (part) of the subframe. When a subframe (determined using a UAI (Uplink Association Index) of the corresponding CC or a specific CC), which is associated with the subframe in which all the CCs are configured as DL, is not configured as UL for all the CCs (e.g. PCC: D, SCC: U), PUSCH related scheduling (e.g. UL grant)/feedback (e.g. PHICH transmission) may be skipped in the corresponding subframe.

Rule 2-2: UAI (Uplink Association Index)

A UAI (refer to Table 6) of a CC having a larger number of UL subframes is commonly applied to all the aggregated CCs. Equivalently, a UAI of a CC having a smaller number of DL subframes is commonly applied to all the aggregated CCs.

*Rules 2-1 and 2-2 describe that the proposed method is applied to all the aggregated CCs when some of the CCs have different UL-DL configurations. However, Rules 2-1 and 2-2 may be modified such that the proposed method is applied to a scheduled CC corresponding to DL ACK/NACK (i.e. a CC on which a PUSCH corresponding to DL ACK/NACK is received) (e.g. SCC) only when UL-DL configuration of the scheduled CC is different from UL-DL configuration of a scheduling CC (e.g. PCC), but otherwise the conventional scheme is applied to determine ACK/NACK timing.

FIGS. 15 and 16 illustrate a DL ACK/NACK timing configuration scheme according to the present embodiment. Here, the PCC corresponds to a scheduling CC and the SCC corresponds to a scheduled CC.

Referring to FIG. 15, it is assumed that the PCC having UL-DL configuration #1 and the SCC having UL-DL configuration #2 are configured for a UE. DL ACK/NACK is transmitted through the PCC. According to Rule 2-1, DL ACK/NACK may be transmitted only in subframes (subframes #0/#1/#4/#5/#6/#9) in which both the PCC and SCC are configured as DL, or a subset of the subframes, from among DL subframes of the PCC. Accordingly, although subframes #3/#8 of the SCC correspond to DL subframes, DL ACK/NACK is not transmitted in the corresponding subframes. The method according to the present embodiment may be applied only to a case in which cross-CC scheduling from the PCC to the SCC occurs.

According to Rule 2-2, UL subframes associated with subframes #0/#1/#4/#5/#6/#9 of the PCC are determined by a UAI of the PCC (i.e. UL-DL configuration #1) (FIG. 16). This is because the number of UL subframes of the PCC is greater than the number of UL subframes of the SCC, equivalently, the number of DL subframes of the PCC is smaller than the number of DL subframes of the SCC.

Accordingly, the UE may determine DL ACK/NACK for the two CCs or a UL subframe that needs to be fed back, by commonly applying the UAI of the PCC to the two CCs when DL ACK/NACK is transmitted on the PCC. If UAI (k) of UL-DL configuration #1 indicates a DL subframe in FIG. 15, DL ACK/NACK for the corresponding DL subframe is not transmitted. Since a PHICH is individually transmitted for each PUSCH, no PUSCH transmission means UL DTX (Discontinuous Transmission). Furthermore, since a PHICH resource uses a PRB index used for PUSCH transmission, the PHICH resource is not allocated when PUSCH transmission is not performed.

According to the proposed method, it is possible to utilize the conventional DL ACK/NACK timing (e.g. UAI) without defining new DL ACK/NACK timing when a plurality of CCs having different UL-DL configurations is aggregated.

Embodiment 3: Nested Carrier Aggregation

As described with reference to FIG. 11, when a plurality of CCs is aggregated, cross-CC scheduling is performed only through a specific CC (e.g. PCC) or UCI is transmitted through only a specific CC. In this case, if a plurality of CCs having different UL-DL configurations is simply aggregated, it is necessary to define a new timing relationship, which is not defined in LTE(-A), such as DL/UL ACK/NACK timing and/or DL/UL grant timing.

FIG. 17 illustrates a case in which new signal transmission timing is required. The present embodiment is based on the assumption that the PCC has UL-DL configuration #2 and the SCC has UL-DL configuration #4. For example, the PCC corresponds to a DL subframe and the SCC corresponds to a UL subframe in subframe #3, and thus cross-CC scheduling from the PCC to the SCC is limited. Accordingly, new grant timing and new PHICH timing need to be defined.

To solve the above-mentioned problem, the present embodiment proposes a method for using the existing UL/DL ACK/NACK timing and DL/UL grant timing by limiting combinations of UL-DL configurations of CCs when a plurality of CCs are aggregated. The method according to the present embodiment may support cross-CC scheduling via a specific CC only (e.g. PCC) or transmission of UAI via a specific CC only.

Specifically, the following scheme is proposed when a plurality of TDD CCs are aggregated.

1. When uplink/downlink control information is transmitted only on a PCC, combinations of UL-DL configurations of CCs may be limited such that a UL subframe set of the PCC includes a UL subframe set of a SCC (referred to as a UL nested structure for convenience)

a. UL grant timing is determined based on the PCC. That is, UL grant timing of the PCC may be commonly applied to all CCs.

b. PHICH timing is determined based on the PCC. That is, PHICH timing of the PCC may be commonly applied to all CCs.

c. UL ACK/NACK timing is determined based on the SCC (when only two CCs are aggregated). That is, UL ACK/NACK timing of the SCC may be commonly applied to all CCs. Alternatively, UL ACK/NACK timing of each CC may be applied as it is. Even in this case, ACK/NACK for a PDSCH of the SCC may be transmitted in a UL subframe of the PCC because UL subframes of the SCC are included in those of the PCC.

2. When the UL subframe set of the PCC does not include the UL subframe set of the SCC, uplink/downlink control information is not transmitted only on the PCC. That is, cross-CC scheduling may not be performed, a PHICH may be transmitted for each CC, or UL ACK/NACK or CSI may be transmitted on all CCs.

FIG. 18 illustrates a nested carrier aggregation scheme according to an embodiment of the present invention. Here, the PCC corresponds to a scheduling CC and the SCC corresponds to a scheduled CC. The present embodiment is based on the assumption that the PCC has UL-DL configuration #1 and the SCC has UL-DL configuration #2. In this case, it is advantageous in that if uplink/downlink control signal is transmitted only on the PCC, it is possible to utilize the conventional timing defined in LTE(-A) intact without introducing new UL grant timing and DL ACK/NACK timing (e.g. PHICH timing). That is, it is advantageous in that UL grant timing of the SCC may utilize UL grant timing of the PCC intact and PHICH timing of the SCC may utilize PHICH timing of the PCC intact. Furthermore, it is advantageous in that as described in embodiment 1, UL ACK/NACK timing may utilize the configuration of the SCC intact. In addition, UL ACK/NACK timing for each CC may be applied utilize. Even in this case, ACK/NACK for a PDSCH of the SCC may be transmitted in a UL subframe of the PCC because UL subframes of the SCC is included in those of the PCC.

FIG. 19 illustrates a nested carrier aggregation scheme according to an embodiment of the present invention. In FIG. 19, subframe configuration according to UL-DL configuration is as defined in Table 1. When two CCs are aggregated, a total of 49 combinations of UL-DL configurations are possible if there is no limitation on the combination of UL-DL configurations. However, in case of nested carrier aggregation, the number of available combinations of UL-DL configurations is reduced to 25.

Alternatively, the following scheme may be considered to commonly apply PCC timing for UL ACK/NACK transmission.

1. When uplink/downlink control information is transmitted only on a PCC, combinations of UL-DL configurations of CCs may be limited such that a DL subframe set of the PCC includes a DL subframe set of a SCC (referred to as a DL nested structure for convenience).

a. UL grant timing is determined based on a specific CC. For example, UL grant timing of the PCC may be applied. Preferably, scheduling for a PUSCH of the SCC may be limited in a subframe in which the PCC corresponds to D and the SCC corresponds to U. Furthermore, one DL subframe needs to schedule a plurality of UL subframes in order to schedule a subframe in which the PCC corresponds to D and the SCC corresponds to U. In this case, a UL subframe indicator (USI) field that indicates one of a plurality of UL subframes may be implicitly or explicitly present in a scheduling PDCCH.

b. (When only two CCs are aggregated) UL ACK/NACK timing of a specific CC is applied. For example, UL ACK/NACK timing of the PCC may be commonly applied to all CCs.

c. PHICH timing is determined based on a specific CC. For example, PHICH timing of the PCC may be commonly applied to all CCs 2. When the DL subframe set of the PCC does not include the DL subframe set of the SCC, uplink/downlink control information is not transmitted only on the PCC. That is, cross-CC scheduling may not be performed, a PHICH may be transmitted for each CC, or UL ACK/NACK or CSI may be transmitted on all CCs.

FIG. 20 illustrates a nested carrier aggregation scheme according to an embodiment of the present invention. In FIG. 20, subframe configuration according to UL-DL configuration is as defined in Table 1. When two CCs are aggregated, a total of 49 combinations of UL-DL configurations are possible if there is no limitation on the combination of UL-DL configurations. However, in case of nested carrier aggregation, the number of combinations of UL-DL configurations available is reduced to 25.

Figure 21:
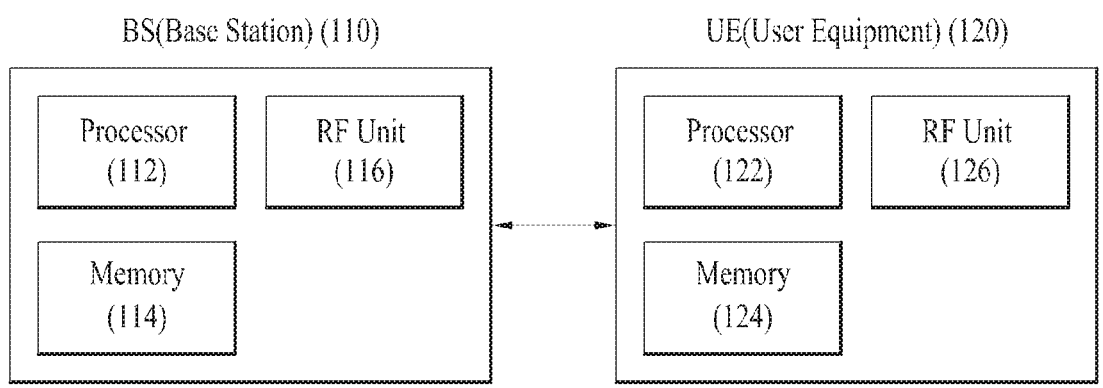
FIG. 21 illustrates a base station (BS) and user equipment (UE) applicable to an embodiment of the present invention.

FIG. 21 illustrates a base station and a UE applicable to an embodiment of the present invention. When a wireless communication system includes a relay, communication is performed between a base station and the relay on a backhaul link and between the relay and a UE on an access link. The base station or UE shown in the figure may be replaced by a relay as necessary.

Referring to FIG. 21, an wireless communication system includes a base station (BS) 110 and a UE 120. The base station 110 includes a processor 112, a memory 114 and an RF (Radio Frequency) unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'eNode B (eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a base station, etc.

The invention claimed is:

1. A method for transmitting uplink control information by a user equipment in a time division duplex (TDD) wireless communication system configured with a plurality of serving cells, the method comprising:
   receiving at least one downlink signal in at least one subframe, the at least one downlink signal requiring a hybrid automatic repeat request acknowledgement (HARQ-ACK) response; and
   transmitting the HARQ-ACK response to the at least one downlink signal on one of the plurality of serving cells,
   wherein when the plurality of serving cells have different uplink-downlink (UL-DL) configurations, the HARQ-ACK response is transmitted only in an uplink subframe which is configured as uplink for all the plurality of serving cells and is associated with the at least one subframe, and
   wherein when the at least one subframe is a subframe n-k and the uplink subframe is a subframe n, k is given by a following table:

| UL-DL Config- | Subframe number | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

2. The method of claim 1, wherein the at least one downlink signal is received on the plurality of serving cells.

3. The method of claim 2,
   wherein the plurality of serving cells comprises a primary cell and a secondary cell, and
   wherein the HARQ-ACK response is transmitted on the primary cell.

4. The method of claim 3, wherein the HARQ-ACK response is transmitted via a physical uplink control channel (PUCCH) of the primary cell.

5. The method of claim 1, wherein the at least one downlink signal includes a physical downlink shared channel (PDSCH) signal or a physical downlink control channel (PDCCH) signal indicating semi-persistent scheduling (SPS) release.

6. A user equipment configured to transmit uplink control information in a time division duplex (TDD) wireless communication system configured with a plurality of serving cells, the user equipment comprising:
   a radio frequency (RF) unit; and
   a processor, wherein the processor is configured to:
   receive at least one downlink signal in at least one subframe, the at least one downlink signal requiring a hybrid automatic repeat request acknowledgement (HARQ-ACK) response, and
   transmit the HARQ-ACK response to the at least one downlink signal on one of the plurality of serving cells,
   wherein when the plurality of serving cells have different uplink-downlink (UL-DL) configurations, the HARQ-ACK response is transmitted only in an uplink subframe which is configured as uplink for all the plurality of serving cells and is associated with the at least one subframe, and
   wherein when the at least one subframe is a subframe n-k and the uplink subframe is a subframe n, k is given by a following table:

| UL-DL Config- | Subframe number | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

7. The user equipment of claim 6, wherein the at least one downlink signal is received on the plurality of serving cells.

8. The user equipment of claim 7,
   wherein the plurality of serving cells comprises a primary cell and a secondary cell, and
   wherein the HARQ-ACK response is transmitted on the primary cell.

9. The user equipment of claim 8, wherein the HARQ-ACK response is transmitted via a physical uplink control channel (PUCCH) of the primary cell.

10. The user equipment of claim 6, wherein the at least one downlink signal includes a physical downlink shared channel (PDSCH) signal or a physical downlink control channel (PDCCH) signal indicating semi-persistent scheduling (SPS) release.

* * * * *